United States Patent Office 3,558,653
Patented Jan. 26, 1971

3,558,653
DIALKYLAMINOALKYL-INDOLINES
William E. Coyne and John W. Cusic, Skokie, Ill., assignors to G. D. Searle & Co., Chicago, Ill., a corporation of Delaware
No Drawing. Filed May 20, 1968, Ser. No. 730,623
Int. Cl. C07d 27/40, 27/38
U.S. Cl. 260—326.11
4 Claims

ABSTRACT OF THE DISCLOSURE 1-aminoalkyl-3,3-diphenyl-indolines and indolinones are described herein. They possess anti-inflammatory, anti-bacterial, anti-protozoal, and anti-algal activity. The indolinones are prepared by the alkylation of the N-unsubstituted compounds while the indolines are obtained by the reduction of the corresponding indolinone.

SUMMARY OF THE INVENTION

The present invention relates to a group of indolines and 2-indolinones having an aminoalkyl substituent on the nitrogen. More particularly, the present invention relates to a group of compounds having the following general formula

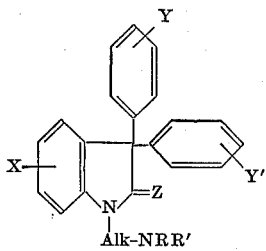

wherein X is selected from the group consisting of hydrogen and methyl; Y and Y' are each selected from the group consisting of hydrogen, methyl, halogen, and methoxy; =Z is selected from the group consisting of =O and =H$_2$; Alk is lower alkylene separating the nitrogens attached thereto by at least two carbon atoms; and —NRR' is selected from the group consisting of di(lower alkyl)amino, 1-pyrrolidinyl, piperidino, morpholino, and 4-methyl-1-piperazinyl.

The lower alkylene radicals referred to above contain up to 6 carbon atoms and can be exemplified by radicals such as ethylene, propylene, trimethylene, and tetramethylene. The lower alkyl radicals referred to above likewise contain up to 6 carbon atoms and can be exemplified by radicals such as methyl, ethyl, propyl, isopropyl, and butyl. The halogen atoms referred to above include fluorine, chlorine, bromine, and iodine.

The organic bases of this invention from pharmaceutically acceptable salts with a variety of inorganic and strong organic acids. Such salts are formed with acids such as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of the present invention are useful because of their pharmacological properties. In particular, the present compounds possess anti-inflammatory activity.

Thus, they have a phenylbutazone-like effect on edematous conditions. The anti-inflammatory utility of the present compounds is demonstrated by the results of a standard test which determines the capacity of a compound to inhibit the edema induced in rats by injection of carrageenin. The procedure is a modification of one described by Winter et al., Proc. Soc. Exper. Biol. and Med., 111, 544 (1962). A compound is administrated subcutaneously or intragastrically, dissolved or suspended in 0.5 ml. of aqueous 0.86% sodium chloride, propylene glycol, a mixture of these vehicles, or corn oil, to each of 10 male rats weighing 100–130 grams. A like group of rats is concurrently administered the same vehicle alone and it serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total circumference of the two hind feet treated therewith, which is measured in arbitrary units 5 hours after the carrageenin injection, is significantly ($P \leq 0.05$) less than the corresponding value for the control group. Thus, subcutaneous administration of 25 mg. of 1-(2-diethylaminoethyl)-3,3-diphenyl-5-methyl-2-indolinone oxalate and 1-(3-dimethylaminopropyl)-3,3-diphenyl-5-methylindoline oxalate each produced an anti-inflammatory effect when tested in the manner described above.

The present compounds also inhibit the germination of seeds of trifolium and they possess anti-biotic activity against a variety of organisms. Thus, they inhibit the growth of bacteria such as *Diplococcus pneumoniae*, protozoa such as *Tetrahymena gelleii*, and algae such as *Chlorella vulgaris*. The present compounds can thus be combined with various known excipients and adjuvants in the form of dusts, solutions, suspensions, ointments, and sprays to provide compositions useful for disinfecting purposes.

The 2-indolinones of the present invention are prepared by reacting a 2-indolinone of the formula

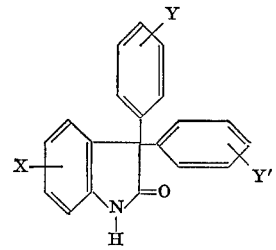

wherein X, Y, and Y' are defined as above, with a strong base such as sodium hydride and an aminoalkyl halide of the formula RR'N—Alk-halogen wherein Alk and —NRR' are defined as above and halogen is preferably chlorine.

The indolines of the present invention are conveniently prepared by the reduction of the corresponding 2-indolinone with an agent such as lithium aluminum hydride.

The following examples are presented to illustrate the present invention; they should not be construed as limiting it in spirit or in scope. In these examples, quantities are indicated in parts by weight and temperatures are indicated in degrees centigrade (° C.).

Example 1

To a stirred solution of 20.3 parts of 4-toluidine in 220 parts of anhydrous ether is added a solution of 25.0 parts of chlorodiphenylacetyl chloride in 175 parts of ether over a period of 5 minutes. The mixture is stirred at room temperature for 3 hours and then filtered and solvent is evaporated from the filtrate until a white crystalline mass forms. This is separated by filtration and washed with hexane to give N-chlorodiphenylacetyl-4-toluidine melting at about 98–105° C.

A mixture of 16.4 parts of the above amide and 300 parts of boron trifluoride trietherate is refluxed for 45 minutes. The resultant mixture is cooled and poured into water and extracted with methylene chloride. The solvent is evaporated from the methylene chloride solution and the residue is refluxed with 360 parts of ethyl acetate and then cooled. The precipitate which forms is separated by filtration to give 3,3-diphenyl-5-methyl-2-indolinone melting at about 277–278° C.

Example 2

To a solution of 4.4 parts of 3,3-diphenyl-5-methyl-2-indolinone in 110 parts of dimethyl sulfoxide is added, under nitrogen, 0.63 parts of sodium hydride as a 56% dispersion in oil. The mixture is stirred for 30 minutes and 3.0 parts of 2-diethylaminoethyl chloride is added and stirring is continued for 16 hours. The mixture is then poured into water and extracted with ether, and the combined ether extracts are dried over potassium carbonate. Evaporation of the solvent leaves a yellow oil which is 1-(2-diethylaminoethyl) - 3,3 - diphenyl-5-methyl-2-indolinone. The oil is dissolved in ethanol and mixed with an ethanol solution of excess oxalic acid. The precipitate which forms is separated by filtration and recrystallized from ethanol to give 1-(2-diethylaminoethyl)-3,3-diphenyl-5-methyl-2-indolinone oxalate melting at about 158–159° C. The free base of this compound has the following formula

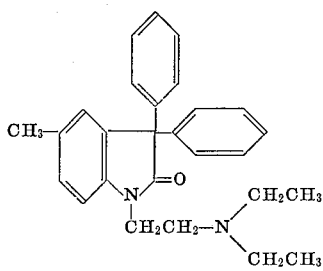

Example 3

The procedure of Example 2 is repeated using 4.4 parts of 3,3-diphenyl-5-methyl-2-indolinone, 0.63 part of sodium hydride as a 56% dispersion in oil, 3.0 parts of 3-dimethylaminopropyl chloride and 110 parts of dimethyl sulfoxide. The oil which forms is mixed with oxalic acid to give 1-(3-dimethylaminopropyl)-3,3-diphenyl-5-methyl-2-indolinone oxalate melting at about 211–213° C. after recrystallization from ethanol.

If the procedure of Example 2 is further repeated substituting an equivalent quantity of the appropriate aminoalkyl chloride for the 2-diethylaminoethyl chloride, the following products are obtained:

3,3-diphenyl-5-methyl-1-(2-piperidinoethyl)-2-indolinone.
3,3-diphenyl-5-methyl-1-[2-(1-pyrrolidinyl)ethyl]-2-indolinone.
3,3-diphenyl-5-methyl-1-(2-morpholinoethyl)-2-indolinone.
3,3-diphenyl-5-methyl-1-[2-(4-methyl-1-piperazinyl)-ethyl]-2-indolinone.

Example 4

2-diethylaminoethyl chloride is reacted with 3,3-diphenyl-2-indolinone, 3,3-di-(4-tolyl) - 2 - indolinone, and 3,3-bis-(4-methoxyphenyl)-2-indolinone according to the procedure described in Example 2 to give, respectively, 1-(2 - diethylaminoethyl)-3,3-diphenyl-2-indolinone, 1-(2-diethylaminoethyl)-3,3 - di-(4-tolyl)-2-indolinone, and 1-(2-diethylaminoethyl) - 3,3 - bis-(4-methoxyphenyl-2-indolinone.

Example 5

7.1 parts of 1-(3-dimethylaminopropyl)-3,3-diphenyl-5-methyl-2-indolinone oxalate is converted to the free amine by dissolving the salt in water and making the solution alkaline with ammonium hydroxide. The resultant mixture is extracted with ether and the ether extracted is dried over potassium carbonate. The resultant dried ether solution is then added to a suspension of 2.0 parts of lithium aluminum hydride in 35 parts of ether under nitrogen and the mixture is stirred and refluxed for 16 hours. The mixture is then decomposed by the successive addition of 2 parts of water, 2 parts of 15% aqueous sodium hydroxide solution, and 6 parts of water. The mixture is then filtered and the ether solvent is evaporated from the filtrate to leave a residual colorless oil which is 1-(3-dimethylaminopropyl) - 3,3 - diphenyl-5-methylindoline. The indoline is dissolved in ethanol and mixed with an ethanol solution of oxalic acid. The precipitate which forms is separated by filtration and recrystallized from ethanol to give 1-(3-dimethylaminopropyl)-3,3-diphenyl-5-methylindoline oxalate melting at about 153–155° C. The free base of this compound has the following formula

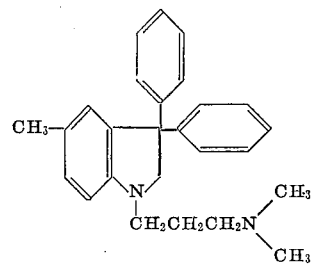

Example 6

3.6 parts of 1-(2-diethylaminoethyl)-3,3-diphenyl-5-methyl-2-indolinone oxalate is converted to the free base and reduced with 2.0 parts of lithium aluminum hydride according to the procedure described in Example 5 to give 1-(2-diethylaminoethyl)-3,3-diphenyl-5-methylindoline oxalate melting at about 200–201° C. after recrystallization from ethanol.

The substituted 2-indolinones described in the second paragraph of Example 3 are reduced with lithium aluminum hydride according to the procedure described in Example 5 to give the following compounds:

3,3-diphenyl-5-methyl-1-(2-piperidinoethyl)indoline.
3,3 - diphenyl-5-methyl-1-[2-(1-pyrrolidinyl)ethyl]-indoline.
3,3-diphenyl-5-methyl-1-(2-morpholinoethyl)indoline.
3,3 - diphenyl - 5 - methyl-1-[2-(4-methyl-1-piperazinyl)-ethyl]indoline.

Example 7

1 - (2 - diethylaminoethyl) - 3,3-diphenyl-2-indolinone, 1-(2-diethylaminoethyl)-3,3-di-(4-tolyl)-2-indolinone and 1 - (2 - diethylaminoethyl)-3,3-bis-(4-methoxyphenyl)-2-indolinone are each reduced with lithium aluminum hydride according to the procedure described in Example 5 to give, respectively, 1-(2-diethylaminoethyl)-3,3-diphenylindoline, 1-(2-diethylaminoethyl)-3,3-di-(4-tolyl)indoline, and 1-(2-diethylaminoethyl)-3,3-bis(4-methoxyphenyl)indoline.

What is claimed is:
1. A compound of the formula

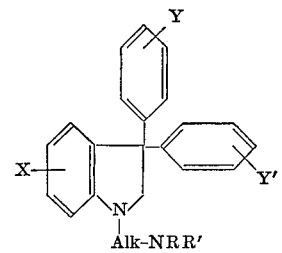

wherein X is selected from the group consisting of hydrogen and methyl; Y and Y' are each selected from the group consisting of hydrogen, methyl and methoxy; Alk is lower alkylene containing up to 6 carbon atoms and separating the nitrogens attached thereto by at least 2 carbon atoms; and —NRR' is selected from the group consisting of di(lower alkyl)amino, 1-pyrrolidinyl, piperidino, morpholino, and 4-methyl-1-piperazinyl.

2. A compound according to claim 1 which has the formula

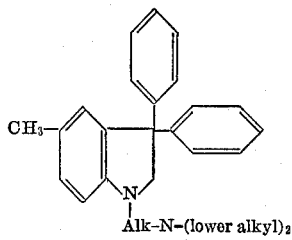

wherein Alk is lower alkylene containing up to 6 carbon atoms and separating the nitrogens attached thereto by at least 2 carbon atoms.

3. A compound according to claim 1 which is 1-(2-diethylaminoethyl)-3,3-diphenyl-5-methylindoline.

4. A compound according to claim 1 which is 1-(3-dimethylaminopropyl)-3,3-diphenyl-5-dimethylindoline.

References Cited

UNITED STATES PATENTS 2,937,173   5/1960   Shapiro et al. ____ 260—326.11X

ALEX MAZEL, Primary Examiner

J. A. NARCAVAGE, Assistant Examiner

U.S. Cl. X.R.

260—247.2, 247.5, 268, 293, 294, 325; 424—248, 250, 267, 274